(12) United States Patent
Bruna et al.

(10) Patent No.: US 7,616,825 B2
(45) Date of Patent: Nov. 10, 2009

(54) METHOD FOR COMPRESSION OF IMAGE DATA AND CORRESPONDING APPARATUS AND COMPUTER-PROGRAM PRODUCT

(75) Inventors: Arcangelo Ranieri Bruna, San Cataldo (IT); Giovanni Gallo, Catania (IT); Sebastiano Battiato, Aci Catena (IT); Salvatore La Rosa, Barrafranca (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 763 days.

(21) Appl. No.: 11/295,174

(22) Filed: Dec. 5, 2005

(65) Prior Publication Data

US 2006/0159356 A1    Jul. 20, 2006

(30) Foreign Application Priority Data

Dec. 10, 2004    (IT) .......................... TO2004A0863

(51) Int. Cl.
   *G06K 9/36*    (2006.01)
   *G06K 9/38*    (2006.01)

(52) U.S. Cl. ...................... 382/251; 382/239
(58) Field of Classification Search ................. 382/239, 382/251
   See application file for complete search history.

(56) References Cited

U.S. PATENT DOCUMENTS 5,107,345 A  *  4/1992  Lee ............................. 382/250
5,263,100 A  *  11/1993  Kim et al. ................... 382/166
6,697,529 B2 *  2/2004  Kuniba ....................... 382/239

OTHER PUBLICATIONS

Nakagawa et al., "DCT-Based Still Image Compression ICS with Bit-Rate Control," 1992, pp. 7-13.*
Bruna et al., "JPEG Compression Factor Control: A new Algorithm," Jun. 19-21, 2001, pp. 206-207.*
Sampat, et al "Sensors, Cameras, and Applications for Digital Photography"; Proceedings of SPIE; Jan. 27-28, 1999; vol. 3650; SPIE; San Jose, CA.
Bruna, et al. "JPEG Compression Factor Control: A New Algorithm"; International Conference on Consumer Electronics; Jun. 19-21, 2001; pp. 206-207; Consumer Electronics; IEEE.
Nakagawa, et al. "DCT-Based Still Image Compression ICS With Bit-Rate Control"; 1992; IEEE.
CCITT-Recommendation T.81, The International Telecommunication Union, ; "Information Technology—Digital Compression and Coding of Continuous-Tone Still Images—Requirements and Guidelines"; The International Telegraph and Telephone Consultative Committee; Sep. 1992; pp. 1-182.
Wook, et al. "A Bit Allocation Method Based on Picture Activity for Still Image Coding"; IEEE Transactions on Image Processing, Jul. 1999; pp. 974-977; vol. 8, No. 7.

* cited by examiner

*Primary Examiner*—Charles Kim
*Assistant Examiner*—John W Lee
(74) *Attorney, Agent, or Firm*—Hogan & Hartson LLP

(57) ABSTRACT

A method for compression includes applying a discrete cosine transform to said image data to obtain transform coefficients, quantizing the transform coefficients by applying a quantization level scaled through a gain value, adjusting the gain value as a function of desired image parameters by executing a first time said quantization operation applying a first gain value and obtaining first quantized data, estimating statistically a second gain value suitable to obtain the desired image parameters, and executing a second time said quantization operation applying said second gain value. The operation of statistical estimation of the second gain value includes evaluating a threshold value as a function of the desired image parameters and setting to zero a percentage of coefficients of the first quantized data as a function of the threshold value.

20 Claims, 5 Drawing Sheets

METHOD FOR COMPRESSION OF IMAGE DATA AND CORRESPONDING APPARATUS AND COMPUTER-PROGRAM PRODUCT

RELATED APPLICATION

The present application claims priority of Italian Patent Application No. TO2004A000863 filed 10 Dec. 2004, which is incorporated herein in its entirety by this reference.

FIELD OF THE INVENTION

The present invention relates to techniques for image compression, and has been developed with specific attention paid to its possible application in rate-control procedures in the context of the Joint Photographic Experts Group (JPEG) standard.

BACKGROUND OF THE INVENTION

Digital images are commonly used in several applications such as, for example, in digital still cameras (DSCs).

A digital image includes of a matrix of elements, commonly referred to as bitmap. Each element of the matrix, which represents an elementary area of the image (a pixel or pel); is formed by several digital values that indicate corresponding components of the pixel.

Digital images typically undergo to processes of compression in order to increase the number of digital images that can be stored simultaneously, for example in the memory of a DSC. Furthermore, this enables transmission of digital images in an easier way and in a shorter time.

A compression method commonly used in standard applications is the compression according to the so-called JPEG standard, which is described in the specification CCITT T.81, 1992.

In the JPEG algorithm, blocks of pixels of a size of 8×8 bits are extracted from the digital image. Then, coefficients of the discrete cosine transform (DCT) are calculated for the components of each pixel block. The DCT coefficients are then quantized using corresponding quantization tables. The quantized DCT coefficients are then coded in order to obtain a compressed digital image, from which it is possible to extract later, via a decompression procedure, the corresponding original digital image.

In some applications, it is necessary to have available a memory of a substantially constant size to store each compressed digital image. This problem is particularly serious, for example in digital still cameras. In fact, in this case, it must be ensured that a minimum number of compressed digital images will be stored in the memory of the camera in order to guarantee that a minimum number of photos can be taken. Control of the compression factor, or rate control, is rather difficult in algorithms, such as JPEG, where the size of the compressed digital image depends upon the contents of the corresponding original digital image.

The JPEG methods for image compression hence envisage adjustment of a gain factor, which multiplies the quantization levels, or quantizers, contained in the quantization tables.

In particular, the purpose of rate-control procedures is to find the gain factor that enables creation of a compressed image with a pre-set dimension of the output file via control of the value of bits per pixel (bpp).

JPEG rate-control procedures can be divided into two categories: iterative ones and statistical ones.

The iterative procedures regulate, through iterative steps, the value of the gain factor in order to achieve the desired value of bits per pixel. At each step the resulting value of bits per pixel produced by the compression operation is compared with the desired value of bits per pixel, and the gain factor is then modified accordingly.

The statistical procedures evaluate, instead, the required value of gain factor G, taking into account the statistical relations between the desired value of bits per pixel and measurements performed on the digital image.

JPEG rate-control procedures can be classified also on the basis of constant precision or constant number of cycles.

In the case of constant-precision procedures, the cycle is repeated until the bitrate lies outside a pre-set precision range. The advantage of constant-precision procedures is that the precision is always guaranteed, but neither the time nor the consumption required by the compression operation are predictable.

Instead, in the case of a constant number of cycles, the precision that will be achieved is not predictable, whilst the time and power consumption are fixed and limited.

FIG. 1 shows a block diagram of a JPEG compression chain. In FIG. 1 the input image data, designated by the reference I, are supplied to a DCT block 10 and then to a quantization block 20. The quantization block 20 receives and uses a scaled quantization level $\tilde{Q}$ that is calculated as the product of a gain factor G and a quantization level Q, according to the relation shown in Equation 1:

$$\tilde{Q} = G \cdot Q \tag{1}$$

The quantization level Q is selected in a quantization table 60.

The output quantized by the quantization block 20 is then supplied at input to a zigzag-ordering block 30 and then to a Huffman-coding block. The Huffman-coding block 40 uses the output signal of the zigzag-ordering block 30 and a Huffman table 50 to generate a JPEG compressed image O.

From documents EP-A-1 179 004, EP-A-1 173 036, EP-A-1 179 026 and A. Bruna, M. Mancuso, "JPEG compression factor control: a new algorithm", ICCE International Conference on Consumer Electronics, 19-21 Jun. 2001, pp. 206-207, a JPEG rate-control procedure is known based upon the statistical properties of JPEG compression.

Said procedure is based upon the statistical relation between the values of bits per pixel and the gain factor. In particular, the relation considered is that established between the gain factor and the factor of bits per pixel when the image is compressed with fixed quantization tables.

Said procedure is a constant-cycle procedure that includes only one cycle, but includes two steps: a first step of recovery, or retrieval, and a second step of rate control. The first, retrieval, step is used for evaluating the parameters necessary to solve the statistical model.

The function that links the gain factor to the value of bits per pixel obtained carrying out a compression of the image with a pre-set factor is approximated via a parabola or a quadratic relation.

The main steps of such a procedure can then be summarized as follows:

- calculating for all the images of the data base a gain factor (Gain*) that produces the desired value of bits per pixel (for example, through a bisection algorithm);
- choosing an intermediate value of gain factor Int_G for performing a first compression, considering the value of gain factor that produces the minimum spreading of the pairs <bpp, Gain> on the set of images of the data base; and using a parabolic function for interpolating the gain factor Gain* as a function of the value of bpp of the compressed-image data obtained applying the value of gain factor Int_G, according to the following equation:

$$G = a \cdot bp^2 + b \cdot bp + c \quad (2)$$

where a, b, c indicate the coefficients of the parabolic function.

The retrieval step supplies at an output the intermediate value of gain factor Int_G for the first compression and the coefficients of the parabola (a, b, c). These values are set in relation with the images of the data base, with the desired value of bits per pixel, and with the subsampling parameters of luminance and chrominance (YUV). When some of these parameters are changed, the values for the changed settings must be retrieved.

For applications for example in digital still cameras, all the cases handled are previously considered and the corresponding settings are retrieved.

FIG. 2 is a schematic illustration of the main processing steps executed in the step of rate control with a statistical procedure, which comprise:

compressing the image data I, using quantization tables pre-scaled according to the intermediate values of gain factor Int_G in a JPEG-compression block 70;

using the value of bits per pixel bpp of the image supplied at output by the JPEG-compression block 70 to estimate a gain factor defined as statistical gain $G_s$ by means of the parabolic function shown in Equation 2; in FIG. 2 said estimation step is represented by a graph 80 that represents the relation between the gain factor Gain* calculated on the image data base and the value of bits per pixel bpp; and using the estimated gain factor $G_s$ for a final JPEG-compression step similar to the step of compression of block 70, but not shown in FIG. 2.

The issues considered previously form the subject of extensive technical literature as testified, for example, by:

CCITT-Recommendation T.81: "information technology—Digital compression and coding of continuous tone still images"—Requirements and guidelines (1992);

"Sensors, cameras and applications for digital photography"—Proceedings of SPIE (Vol. 3650, January 1999);

Blaskaran, Konstantinides, "Image and video compression standards"—(pp. 86-93);

Nakagawa et al., "DCT-based still image compression ICS with Bit-Rate Control"—IEEE Trans. on Consumer Electronics, Vol. 38, No. 3, August 1992;

Wook Joong Lim et al., "A bit allocation method based on picture activity for still image coding"—IEEE Trans. on Image Proc., Vol. 8, No. 7, July 1999;

A. Bruna, M. Mancuso, "JPEG compression factor control: a new algorithm", Consumer Electronics, 2001. ICCE. International Conference on Consumer Electronics, 19-21 Jun. 2001, Page(s): 206-207; and Nakagawa et al.: DCT-based still image compression ICS with bit-rate control (IEEE 1992).

In applications where the desired value of bits per pixel is fixed at the moment of design or in any case pre-set, such as, for example, in digital still cameras in which usually a selector enables the quality of the image to be selected from among different levels of quality, with known systems it is, however, difficult to perform the compression with a single compression procedure performed just once, maintaining a good precision. The fact of having to re-apply the compression procedure a number of times entails a longer time for operation and higher power consumption.

SUMMARY OF THE INVENTION

The purpose of the present invention is to overcome drawback such as the one described above and to propose a solution that will enable a compression to be performed just once maintaining an acceptable level of precision.

According to the present invention, the above purpose is achieved by a method having the characteristics recalled in the ensuing claims, which form an integral part of the technical teaching regarding to the invention.

A method for the compression of image data according to the present invention includes applying a discrete cosine transform to said image data to obtain transform coefficients, quantizing said transform coefficients by applying a quantization level scaled through a gain value, adjusting said gain value as a function of desired image parameters, executing a first time said quantization operation by applying a first gain value and obtaining first quantized data, estimating statistically a second gain value suitable for obtaining said desired image parameters, executing a second time said quantization operation by applying said second gain value, and said operation of statistically estimating a second gain value comprises evaluating a threshold value as a function of said desired image parameters and setting to zero a percentage of coefficients of said first quantized data as a function of said threshold value.

The present invention also regards a corresponding compression apparatus, as well as a computer-program product that can be loaded into the memory of at least one computer and comprises portions of software code for implementing the aforesaid method. As used herein, reference to such a computer-program product is understood as being equivalent to reference to a computer-readable medium containing instructions for controlling a computer system in order to co-ordinate execution of the method according to the invention. Reference to "at least one computer" is intended to highlight the possibility for the present invention to be implemented in a distributed and/or modular way.

BRIEF DESCRIPTION OF THE DRAWINGS

The invention will now be described, by way of non-limiting example, with reference to the figures of the annexed plate of drawings, in which.

DETAILED DESCRIPTION OF PREFERRED EMBODIMENTS

In brief, a block-compression method and a corresponding compression apparatus are proposed, which envisage execution of a JPEG compression with a pre-set or desired bitrate.

The bitrate is obtained using a procedure of a statistical type and is based upon observation by the Applicant of a statistical fact: the value of bits per pixel bpp can be set, in fact, in relation to the number of zeros in the quantized coefficients obtained from the discrete cosine transform via a relation of a linear type.

Figure 3:
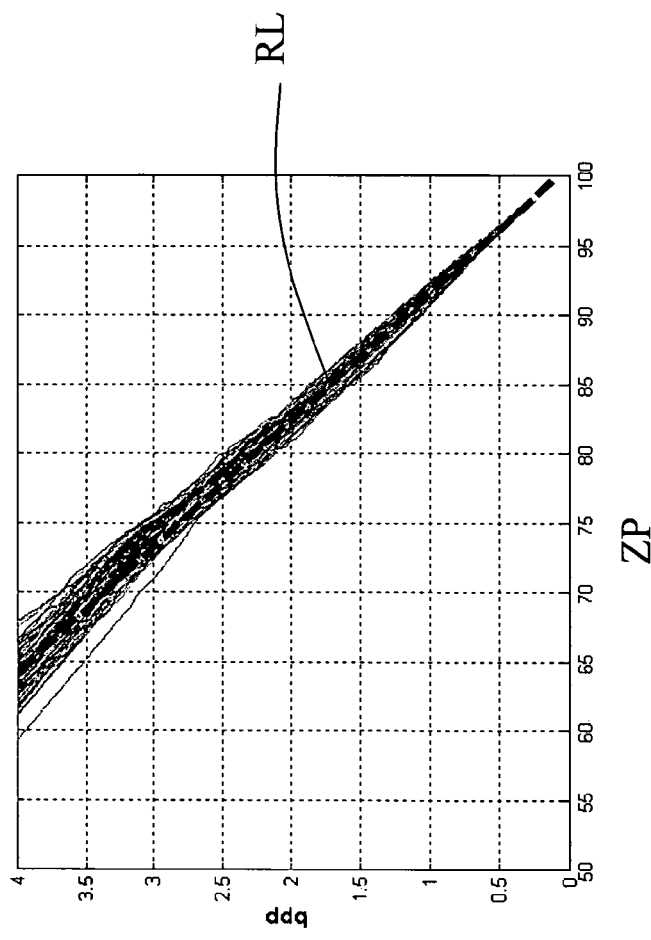
FIG. 3 shows a graph used by the image-compression method according to an embodiment of the invention.

FIG. 3 shows a graph that gives, as a function of a zero percentage ZP on the abscissa, the corresponding value of bits per pixel bpp on the ordinate. A dashed line RL represents a linear regression calculated on the values of bits per pixel bpp that can be assumed. According to the compression method proposed, it is envisaged to execute a retrieval step of a statistical type that enables identification of a mean interpolation point PMI given by the mean of the values of zero percentage ZP obtained at a constant value of bits per pixel bpp. Said mean interpolation point PMI depends upon a desired value of bits per pixel T and upon a size of the image S. For this reason, for each desired image size S and value of bits per pixel T, the zero percentage ZP that must contain the quantized coefficients is known.

Consequently, the method proposed substantially regulates the number of zeros of the quantized coefficients in order to satisfy the aforementioned constraint.

The method according to the invention hence envisages execution of the following steps.

Execution of a first mild quantization operation on DCT coefficients with a first gain value $G_0$ in order to obtain a granular histogram H, hence with a value sufficiently low to ensure the highest possible number of coefficients quantized with different values.

Figure 4:
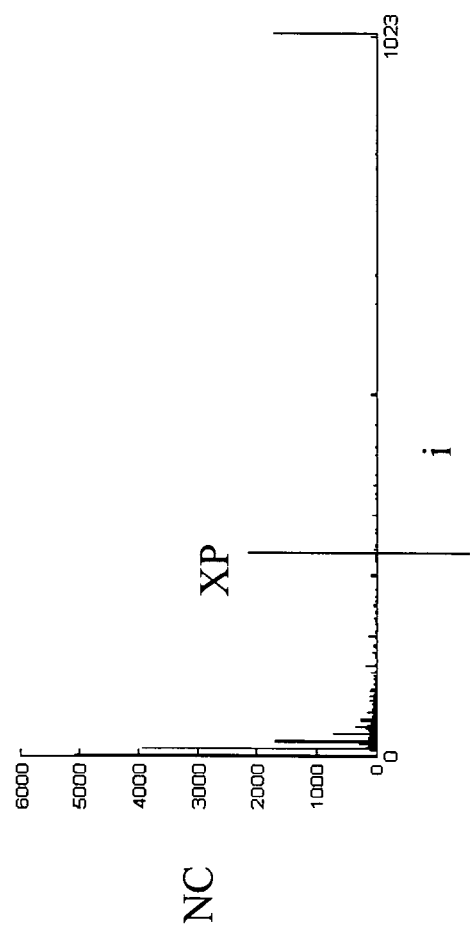
FIG. 4 shows a histogram used by the image-compression method according to an embodiment of the invention.

Construction of said histogram H collecting all the quantized coefficients of the image data; an example of said histogram H is shown in FIG. 4, where given on abscissa is an index "i" of the coefficients and on the ordinate a number NC of coefficients for each given index "i".

Fixing of a zero-percentage point XP on the abscissa of the histogram H; all the coefficients falling under said zero-percentage point XP must be zeros.

Calculation of a new gain value $G_T$ starting from the zero-percentage point XP.

Quantization of the DCT coefficients with the new gain value so as to obtain the desired value of bits per pixel T.

Figure 1:
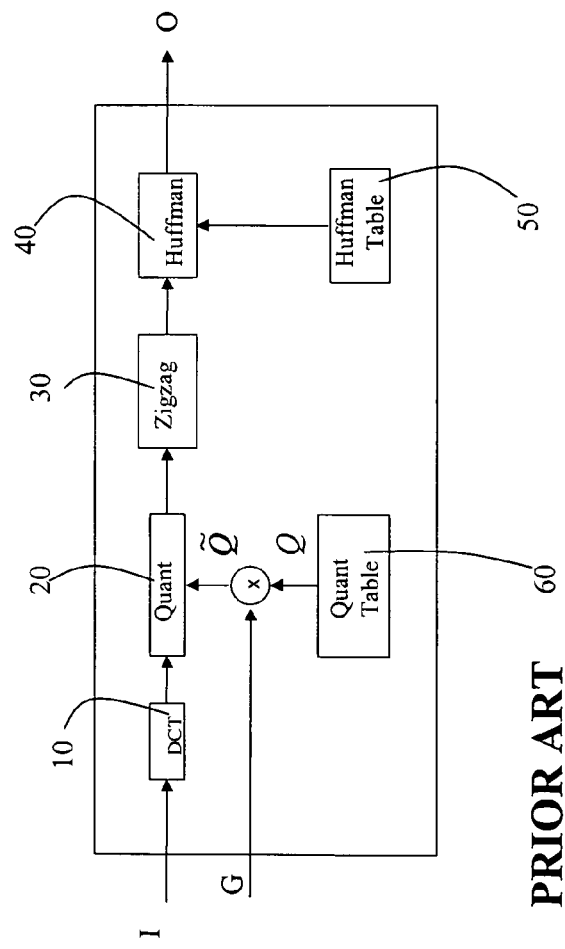
FIG. 1 shows a block diagram of a JPEG compression chain according to the prior art.
Figure 2:
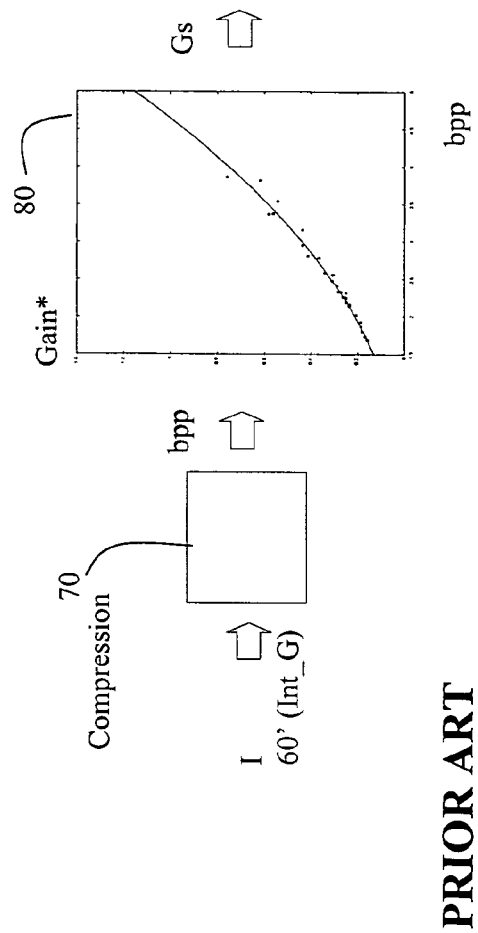
FIG. 2 is a schematic illustration of the main processing steps executed in the step of rate control with a statistical procedure according to the prior art.
Figure 5:
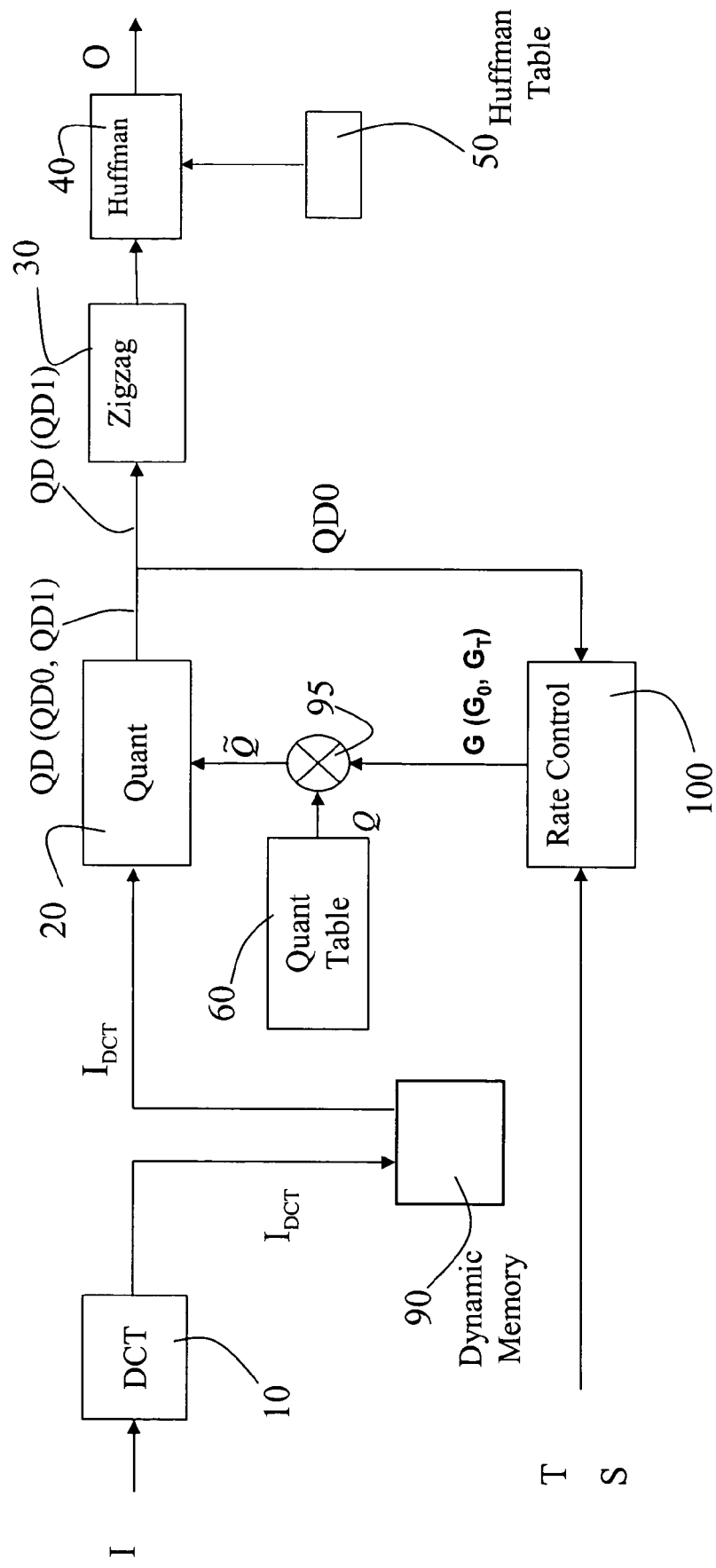
FIG. 5 shows a block diagram representing a coding apparatus implementing the image-compression method according to an embodiment of the invention.

FIG. 5 shows a block diagram of a coding apparatus that implements the method according to the invention. In FIG. 5, the blocks having functions similar to those of the blocks of FIG. 1 are designated by the same reference numbers.

In said apparatus, the image data I, already converted into the YCbCr form of representation deriving from the original RGB format, are then sent on to the DCT block 10, which produces at output the transform coefficients $I_{DCT}$. Said transform coefficients $I_{DCT}$ are stored in a dynamic-memory element 90, in particular a DRAM (Dynamic Random Access Memory) and are then supplied to the quantization block 20. Said quantization block 20 receives and uses the scaled quantization level $\tilde{Q}$, which is calculated as the product of the gain factor G and a quantization level Q, produced by the quantization table 60 according to Equation 1 given above. Said quantization block 20 hence produces at output quantized data QD, which contain the quantized DCT coefficients.

According to one aspect of the invention, a rate-control block 100 is provided, which supplies to a multiplier 95 the gain value G to be multiplied by the value of quantization level Q in order to implement Equation 1 and to supply the scaled quantization level $\tilde{Q}$ to the quantization block 20. The rate-control block 100 receives at one input thereof a desired value of bits per pixel T and a desired value of size of the image S.

According to the invention, the coding apparatus illustrated in FIG. 5 presents at least two distinct operating steps.

In a first operating step, the transformed signal $I_{DCT}$ is written into the dynamic memory 90, and then applied thereon in the quantization module 20 is a mild quantization, with an initial gain value $G_0$ described previously, to produce mildly quantized data QD0. Said mildly quantized data QD0, i.e., DCT quantized coefficients, are sent to a rate-control block 100 so as to populate the histogram H, already described with reference to FIG. 4, and evaluate the population of the histogram. As will be described in greater detail hereinafter, with reference to FIG. 6, a final gain value $G_T$ is then calculated, which is used to quantize again, in the quantization block 20, the transformed signal $I_{DCT}$ stored in the dynamic memory 9 and produce at output final quantized data QD1, which are then supplied at input to the zigzag-ordering block 30 and to the subsequent Huffman-coding block 49 to generate the JPEG compressed image O.

It should be noted that, notwithstanding the two distinct operating steps, the method is configured as a one-pass method, i.e., a method executed just once, in so far as the main blocks involved in the JPEG compression are used just once. Only the quantization operation is performed twice.

Figure 6:
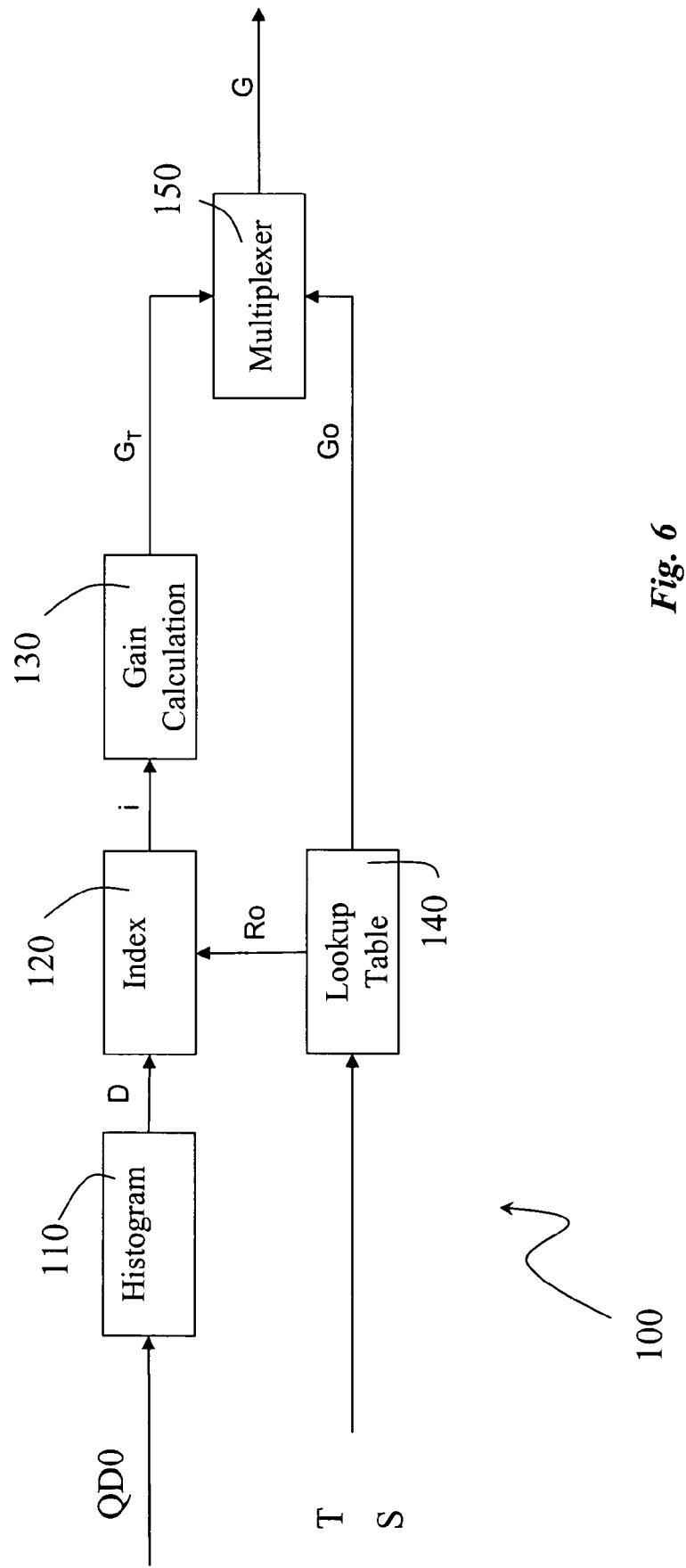
FIG. 6 is a schematic illustration of a detail of the coding apparatus of FIG. 5.

FIG. 6 shows a detail of the rate-control block 100.

In said rate-control block 100, the mildly quantized data QD0 are sent on to a module for population of the histogram 110, which populates the histogram H of FIG. 4.

The desired value of bits per pixel T and the value of size of the image S are instead supplied as input data for a search in a pre-loaded look-up table 140, which supplies at output a threshold value $R_0$, which indicates heuristically the correct zero percentage ZP. Said threshold value $R_0$ is supplied, together with values of population D of the histogram, generated by the module for the population of the histogram 110, to a block for determining the index 120, which derives the index "i" of the coefficient. Said index "i" is supplied to a gain-calculation block 130, which supplies at output the final gain value $G_T$. Said final gain value $G_T$ is sent on to one of the inputs of a multiplexer 15, which receives at another input thereof the initial gain value $G_0$, supplied by the pre-loaded look-up table 140.

In the first operating step, the multiplexer 160 selects as gain G said initial gain value $G_0$, which is chosen heuristically so as to enable a mild quantization to be carried out at block 20 that will ensure a histogram H with a fine granularity. Preferably, with 1024 coefficients in the quantized data QD, $G_0$ is set equal to $1/1024$, in so far as the hardware implementation is simpler.

In the second operating step, the multiplexer 150 selects, instead, as gain G the final gain value $G_T$.

The block for determining the index 120 at the end of the first operating step calculates the value of the index "i" according to the following relation:

$$i: \sum_{j=0}^{i} D(j) \leq R_o \qquad (3)$$

The gain-calculation block 130 implements, instead, the following relation:

$$G\left|\text{round}\left[\frac{i}{G}\right]\right| = 0 \Rightarrow \frac{i}{G} < 0.5 \quad (4)$$

$$G_T = G \cdot G_0 = \frac{i}{0.49} \cdot G_0$$

As may be inferred from Equations 4, the value 0.49 is a factor chosen from among all the ones that satisfy the condition of inequality (i/G<0.5).

A better precision can be obtained using the following relation:

$$G_T = \frac{i + \text{ratio}}{0.49} \cdot G_0, \quad (5)$$

$$\text{ratio} = \frac{R_0 - \sum_{j=0}^{i} H(j)}{H(j+1)}$$

where with H(j) are the values of the histogram H defined previously.

The pre-loaded look-up table 140 contains data obtained heuristically. The parameters depend upon the size of the image S and upon the desired value of bits per pixel T.

The pre-loaded look-up table 140 contains the initial gain value $G_0$ and the threshold value $R_0$. The initial gain value $G_0$ is the first multiplier of the quantizer Q that is used in the first step. The threshold value $R_0$ contains the zero percentage ZP used in the block for determining the index 120.

Table 1 shows an example, corresponding to VGA and CIF images with 3.2 bpp, 1.6 bpp, 0.8 bpp of desired value of bits per pixel T, of values assumed by the initial gain value $G_0$ and by the threshold value $R_0$.

TABLE 1

| S | T 3.2 | T 1.6 | T 0.8 |
|---|---|---|---|
| VGA (640 × 480) | $R_0$ = 446000 $1/G_0$ = 1024 | $R_0$ = 530000 $1/G_0$ = 1024 | $R_0$ = 575000 $1/G_0$ = 1024 |
| CIF (352 × 288) | $R_0$ = 149000 $1/G_0$ = 1024 | $R_0$ = 175555 $1/G_0$ = 1024 | $R_0$ = 190035 $1/G_0$ = 1024 |

Figure 8:
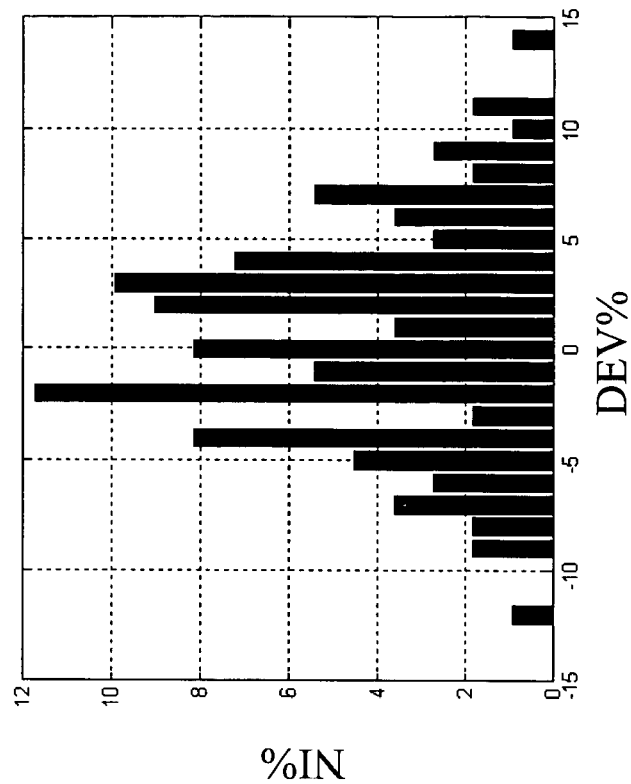
FIG. 7 and FIG. 8 show error diagrams corresponding to tests of the method according to the invention.
Figure 7:
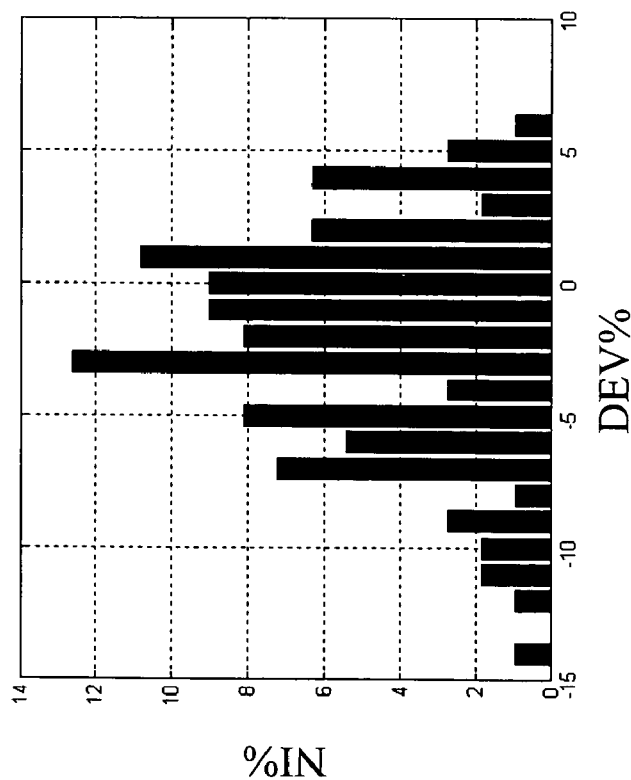

FIGS. 7 and 8 show histograms of error distribution corresponding to tests performed on the coding apparatus described with reference to FIGS. 5 and 6. The desired value of bits per pixel T is 3.2 and the resolution is VGA for the histogram of FIG. 7 and CIF for the histogram of FIG. 8. For the tests, a database was used with a number of images IN equal to 110, captured with a CMOS-VGA sensor in an "STV6500-E01" Evaluation Kit equipped with a sensor "502 VGA", as described in Colour Sensor Evaluation Kit VV6501, STMicroelectronics, Edinburgh, www.edb.st.com, 2003. The histograms give the percentage image number NI % as a function of the percentage deviation DEV %.

Consequently, without prejudice to the principle of the invention, the details of implementation and the embodiments may vary, even significantly, with respect to what is described and illustrated herein, purely by way of non-limiting example, without thereby departing from the scope of the invention, as defined in the ensuing claims.

We claim:

1. A method for the compression of image data, comprising: using a computer to implement steps comprising:
   applying a discrete cosine transform to said image data to obtain transform coefficients;
   quantizing said transform coefficients by applying a quantization level scaled through a gain value;
   adjusting said gain value as a function of desired image parameters;
   executing a first time said quantization operation by applying a first gain value and obtaining first quantized data;
   estimating statistically a second gain value,
   said operation of statistically estimating a second gain value comprises evaluating a threshold value as a function of said desired image parameters and setting to zero a percentage of coefficients of said first quantized data as a function of said threshold value; and executing a second time said quantization operation by applying said second gain value.

2. The method according to claim 1, wherein:
   said first quantization operation is performed with a first gain value such as to determine a granular histogram of said first quantized data supplied by said first quantization operation; and
   said operation of statistical estimation of a second gain value comprises:
   populating said histogram collecting said first quantized coefficients;
   calculating an index representing said percentage of coefficients of said histogram to be set to zero as a function of said threshold value; and
   calculating said second gain value as a function of said index.

3. The method according to claim 2, wherein said step of calculating said second gain value as a function of said index comprises multiplying said index representing said percentage of coefficients to be set to zero by the first gain value and by a further factor associated to the condition of setting to zero coefficients of the first quantized data.

4. The method according to claim 2, wherein said step of evaluating a threshold value as a function of said desired image parameters comprises evaluating a correlation between said desired image parameters and said zero percentage.

5. The method according to claim 4, wherein said evaluation of the correlation comprises looking up threshold values in a pre-loaded table.

6. The method according to claim 1, wherein said desired image parameters comprise a desired value of bits per pixel.

7. The method according to claim 6, wherein said desired image parameters comprise a size of the image.

8. The method according to claim 1, further comprising storing said transform coefficients for providing said first and second quantization operations.

9. The method according to claim 1, wherein said compression is operated according to the JPEG standard.

10. An apparatus for compression of image data, comprising:
    a module configured for applying a discrete cosine transform to said image data to obtain transform coefficients;
    a module configured for quantizing said transform coefficients applying a quantization level (Q) scaled through a gain value; and
    a rate-control module configured for adjusting said gain value as a function of desired image parameters and supplying a first gain value to said quantization module to execute a first time a quantization operation obtaining first quantized data, said rate-control module being moreover configured for statistical estimation of a second gain value evaluating of a threshold value as a function of said desired image parameters and modules for setting to zero a percentage of coefficients of said first quantized data as a function of said threshold value and supplying said second gain value to said quantization module to execute said quantization operation a second time.

11. The apparatus according to claim 10, configured for executing said first quantization operation with a first gain value to determine a granular histogram of said first quantized data supplied by said first quantization operation, and in that said rate-control module comprises:

a module for populating said histogram collecting said first quantized coefficients;

a module for calculating an index representing said percentage of coefficients of said histogram set to zero as a function of said threshold value received by said module for evaluation of a threshold value; and a module for calculating said second gain value as a function of said index.

12. The apparatus according to claim 11, wherein said module for calculating said second gain value as a function of said index is configured for multiplying said index representing said percentage by the first gain value and by a further factor associated to the condition of setting the coefficients to zero.

13. The apparatus according to claim 11, wherein said module for evaluating a threshold value as a function of said desired image parameters is configured for evaluating a correlation between said desired image parameters and said zero percentage.

14. The apparatus according to claim 13, wherein said module for evaluating a threshold value as a function of said desired image parameters comprises a look-up table.

15. The apparatus according to claim 10, wherein said desired image parameters comprise a desired value of bits per pixel.

16. The apparatus according to claim 15, wherein said desired image parameters comprise a size of the image.

17. The apparatus according to claim 10, further comprising dynamic-memory elements for storing said transform coefficients and supplying them to said quantization module.

18. The apparatus according to claim 10, wherein said compression is operated according to the JPEG standard.

19. A computer-readable medium which a computer-program product can be loaded into the memory of at least one computer and comprises portions of software code for implementing a method for the compression of image data, the method comprising:

applying a discrete cosine transform to said image data to obtain transform coefficients;

quantizing said transform coefficients by applying a quantization level scaled through a gain value;

adjusting said gain value as a function of desired image parameters;

executing a first time said quantization operation by applying a first gain value and obtaining first quantized data;

estimating statistically a second gain value, and said operation of statistically estimating a second gain value comprises evaluating a threshold value as a function of said desired image parameters and setting to zero a percentage of coefficients of said first quantized data as a function of said threshold value and executing a second time said quantization operation by applying said second gain value.

20. A computer-readable medium according to claim 19, wherein:

said first quantization operation is performed with a first gain value such as to determine a granular histogram of said first quantized data supplied by said first quantization operation; and said operation of statistical estimation of a second gain value comprises:

populating said histogram collecting said first quantized coefficients;

calculating an index representing said percentage of coefficients of said histogram to be set to zero as a function of said threshold value; and calculating said second gain value as a function of said index.

* * * * *

UNITED STATES PATENT AND TRADEMARK OFFICE
CERTIFICATE OF CORRECTION

PATENT NO. : 7,616,825 B2
APPLICATION NO. : 11/295174
DATED : November 10, 2009
INVENTOR(S) : Bruna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Nineteenth Day of October, 2010

David J. Kappos
*Director of the United States Patent and Trademark Office*